United States Patent [19]

Mikofalvy et al.

[11] 3,867,331

[45] Feb. 18, 1975

[54] PROCESS FOR MAKING EMULSION POLYMERIZED PREPLASTICIZED VINYL RESINS

[75] Inventors: Bela K. Mikofalvy, Sheffield Lake; Thomas J. Doyle, Lorain, both of Ohio

[73] Assignee: The B. F. Goodrich Company, New York, N.Y.

[22] Filed: Apr. 1, 1974

[21] Appl. No.: 457,117

Related U.S. Application Data

[63] Continuation-in-part of Ser. No. 392,527, Aug. 29, 1973, abandoned.

[52] U.S. Cl....260/31.8 R, 260/30.6 R, 260/31.8 DR, 260/31.8 HR, 260/31.8 AN, 260/31.8 HA, 260/31.8 C, 260/34.2
[51] Int. Cl. ............................................ C08f 45/38
[58] Field of Search .. 260/29.6 MP, 31.8 R, 30.6 R, 260/34.2, 31.8 HA, 31.8 C, 31.8 DR, 31.8 AN, 31.8 HR

[56] References Cited
UNITED STATES PATENTS

| | | | |
|---|---|---|---|
| 2,068,424 | 1/1937 | Mark et al. | 260/92.8 W |
| 2,674,593 | 4/1954 | Condo et al. | 260/31.8 R |

OTHER PUBLICATIONS

The Condensed Chemical Dictionary, Sixth Edition, Reinhold Pub. Corp., New York, 1961 pages 629–630.

*Primary Examiner*—James H. Derrington
*Attorney, Agent, or Firm*—Roy P. Wymbs

[57] ABSTRACT

There is disclosed a process for preparing preplasticized vinyl resins by conducting the polymerization reaction of the vinyl monomer or monomers in the presence of a plasticizer therefor while employing an emulsion polymerization technique. In said polymerization reaction the plasticizer and vinyl monomer or monomers are thoroughly mixed together prior to the start of the polymerization reaction and then said mixture is homogenized prior to the start of the reaction.

13 Claims, No Drawings

PROCESS FOR MAKING EMULSION POLYMERIZED PREPLASTICIZED VINYL RESINS

CROSS REFERENCE TO RELATED APPLICATION

This application is a continuation-in-part of copending application Ser. No. 392,527 filed Aug. 29, 1973, now abandoned.

BACKGROUND OF THE INVENTION

It is well known that vinyl resins may be plasticized or changed from the hard, horny and stiff state to a soft, plastic, workable condition by the addition at elevated temperatures of certain plasticizer, such as dioctyl phthalate, and the like. It has also been suggested to prepare vinyl resins by polymerizing the monomers in the presence of a plasticizer. However, such suggestions and the disclosures thereof have been general in nature with no suggested details of how this objective might be specifically accomplished.

One of the problems encountered heretofore when mixing a plasticizer with a vinyl resin has been the poor colloidal stability of the resultant composition. Further, there is a low limit as to the amount of plasticizer that can be used and still obtain a product that is workable and not a sticky mass. In addition, the plasticizer is easily extractable from the vinyl resin and also has a tendency to migrate. Due to all these poor properties, vinyl resin latexes have poor shelf-life.

Merely preparing vinyl resins by polymerizing in the presence of a plasticizer is not enough. Certain important steps must be followed in order to achieve the desired result, namely, to incorporate sufficient plasticizer to give the desired result with good colloidal stability and good heat and light stability.

SUMMARY OF THE INVENTION

We have unexpectedly found that preplasticized vinyl resins can readily be made by polymerizing the vinyl monomer or monomers while in intimate admixture with a plasticizer therefor using an emulsion polymerization system. Most importantly, and particularly when significant amounts of plasticizer are employed, the vinyl monomer or monomers and the plasticizer are homogenized prior to introduction into the reaction vessel. Thorough mixing prior to starting the polymerization reaction is imperative, otherwise coagulation will result. This new process is referred to throughout the present application as "plastimerization" for purposes of convenience.

DETAILED DESCRIPTION

In the present invention, "vinyl resin" refers to polymers and copolymers of vinyl and vinylidene halides, such as vinyl chloride, vinylidene chloride, and the like. The vinyl halides and vinylidene halides may be copolymerized with each other or either may be copolymerized with one or more vinylidene monomers having at least one terminal

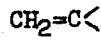

grouping. As examples of such vinylidene monomers may be mentioned the $\alpha,\beta$-olefinically unsaturated carboxylic acids, such as acrylic acid, methacrylic acid, ethacrylic acid, $\alpha$-chloroacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamide, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate, vinyl pyridine, methyl vinyl ketone; diolefins, including butadiene, isoprene, chloroprene, and the like; and mixtures of any of these types of monomers and other vinylidene monomers copolymerizable therewith including esters of maleic and fumaric acid, and the like; and other vinylidene monomers of the types known to those skilled in the art. The present invention is particularly applicable to the manufacture of resinous latices made by the polymerization, in the presence of a suitable plasticizer therefor, of vinyl chloride or vinylidene chloride alone or in admixture with one or more vinlidene monomers copolymerizable therewith in amounts as great as about 80% by weight, based on the weight of the monomer mixture. The most preferred vinyl resin is polyvinyl chloride and the invention, for simplicity and convenience, will be described in connection therewith, it being understood that this is merely intended in an illustrative sense and not limitative.

The present process for preparing vinyl polymers or resins is by means of an emulsion polymerization technique in an aqueous medium in the presence of a plasticizer for the particular vinyl polymer being prepared. Among the various plasticizers that may be employed in making the vinyl polymers are the organic phosphoric esters such as tricresyl phosphate, triphenyl phosphate, isodecyl diphenyl phosphate, tributoxy ethyl phosphate, and the like; phthalic esters, such as dioctyl phthalate, dimethyl phthalate, dibutyl phthalate, dilauryl phthalate, dimethyl tetrachlorophthalate, butyl phthalyl butyl glycollate, and the like, In fact, any known plasticizer for polymeric vinyl halides may be employed in the polymerization reaction. It has been found that from about 5 parts to about 100 parts by weight of plasticizer, based on 100 parts by weight of monomer or monomers being polymerized can be charged as a polymerization ingredient. Usually an amount of plasticizer in the range of 15 parts to 90 parts by weight is sufficient. When amounts of plasticizer greater than 100 parts by weight are employed, the polymerization rate and the degree of conversion are adversely affected.

While the amount of plasticizer employed in the plastimerization process is limited for practical purposes, further plasticizer can be incorporated in the finished plastimerized vinyl polymer or resin. The polymers produced by the process of the present invention have an unusually high affinity to plasticizers. This is believed to be due to the microstructure of the polymer particles and they seem to be more open structured. In any event, it is possible to incorporate further plasticizer in the finished polymer, by usual means, in varying amounts up to as high as 150 parts by weight of total plasticizer based on the weight of 100 parts of monomer or monomers originally polymerized. By total plasticizer is meant the plasticizer in the polymer from the plastimerization process plus that added to the finished polymer. This feature of the polymers produced by the present invention makes them particularly attractive as blend resins, such as in polyblends with nitrile rubbers.

The aqueous medium used in making the vinyl polymers by the present inventive emulsion polymerization system usually contains an emulsifier. When emulsifiers are used to prepare the vinyl polymer latices, the general types of anionic and nonionic emulsifiers are employed. Excellent results have been obtained when using anionic emulsifiers. Useful anionic emulsifiers include alkali metal or ammonium salts of the sulfates of alcohols having from 8 to 18 carbon atoms, such as sodium lauryl sulfate, ethanolamine lauryl sulfate, ethylamine lauryl sulfate, and the like; alkali metal and ammonium salts of sulfonated petroleum and paraffin oils; sodium salts of aromatic sulfonic acids, such as dodecane-1-sulfonic acid and octadiene-1-sulfonic acid; aralkyl sulfonates, such as sodium isopropyl benzene sulfonate, sodium dodecyl benzene sulfonate, sodium isobutyl naphthalene sulfonate, and the like; alkali metal and ammonium salts of sulfonate dicarboxylic acid esters, such as sodium dioctyl sulfosuccinate, disodium-n-octadecyl sulfosuccinate, and the like; alkali metal and ammonium salts of free acid of complex organic mono- and di-phosphate esters, and the like. Nonionic emulsifiers, such as octyl- or nonylphenyl polyethoxyethanol, may also be used. Vinyl polymer latices having excellent stability are obtained when employing the alkali metal and ammonium salts of aromatic sulfonic acid, aralkyl sulfonates and long chain sulfonates.

The amount of emulsifier employed may range in amount up to about 6% or more by weight, based on the weight of 100 parts of monomer or monomers being polymerized. The emulsifier is pre-mixed with the monomer and plasticizer prior to the start of the polymerization, particularly when the premix is homogenized, as explained more fully hereinafter. However, the emulsifier may be added incrementally or by proportioning throughout the polymerization reaction.

In carrying out the emulsion polymerization of vinyl monomers in accordance with the present invention in the presence of a plasticizer for the polymer being produced, the polymerization temperature is not critical. However, it is imperative that the reaction be conducted at a temperature below the glass transition temperature (Tg) of the polymer being produced. If the temperature of polymerization is not below the Tg of the polymer, coagulation will result. For example, the Tg of polyvinyl chloride is 85°C. and therefore, the polymerization of vinyl chloride must take place below about 85°C. in order to produce a satisfactory product. We have found that temperatures in the range of about 15°C. to about 75°C. are satisfactory for polymerizing the vinyl monomers in accordance with the instant process. Preferably, a temperature in the range of about 40°C. to about 55°C. is employed.

The plastimerization process described herein is conducted in the presence of a compound capable of initiating the polymerization reaction. Free radical yielding initiators, normally used for polymerizing olefinically unsaturated monomers, are satisfactory for use in the present process. These initiators or catalysts include, for example, the various peroxygen compounds, such as persulfates, benzoyl peroxide, t-butyl hydroperoxide, cumene hydroperoxide, t-butyl diperphthalate pelargonyl peroxide, 1-hydroxycyclohexyl hydroperoxide, and the like; azo compounds, such as azodiisobutyronitrile, dimethylazodiisobutyrate, and the like. Particularly useful initiators are the water-soluble peroxygen compounds, such as hydrogen peroxide, lauryl peroxide, isopropyl peroxydicarbonate, and the like, and the sodium, potassium and ammonium persulfates used by themselves or in an activated redox system. Typical redox systems include alkali metal persulfates in combination with a reducing substance, such as sodium sulfite or sodium bisulfite, a reducing sugar, dimethylamino propionitrile, a diazomercapto compound and a water-soluble ferricyanide compound, or the like. Heavy metal ions may also be used to activate the persulfate catalyzed polymerization. Particularly useful are alkali metal and ammonium persulfate. The amount of initiator used will generally be in the range between about 0.1% to about 3.0% by weight, based on the weight of 100 parts of monomer or monomers being polymerized, and preferably between about 0.15% and about 1.0% by weight.

Generally, the initiator is charged completely at the outset of the polymerization. However, it is often advantageous the employ incremental addition or proportioning of the initiator throughout the polymerization reaction. When the initiator is charged at the outset it is added to the monomer premix with the other ingredients of the reaction mixture. This is particularly true when said premix is homogenized prior to introduction into the reactor. However, when adding the initiation to the premix and then homogenizing, it is necessary that the temperature during the premixing and homogenization steps be kept below the minimum temperature of reactivity of the particular initiator or initiators being employed. For example, when making a premix of vinyl chloride, water and suitable emulsifiers, and then adding isopropyl peroxydicarbonate thereto, the temperature is maintained at 20°C. during the mixing step and then during the homogenization step. Upon introduction of the homogenized mixture into the polymerization reactor, the temperature is then raised to that at which the reaction is to take place.

One of the most important aspects of the process of the instant invention is the step of homogenization. The plasticizer must be thoroughly and intimately mixed with the monomer or monomers when more than one is employed, prior to the commencement of the polymerization reaction. This mixture is referred to as the monomer premix and will also contain the water or reaction medium. Further, any emulsifier being employed will likewise be added to the premix, all of the ingredients being added with suitable agitation. If the catalyst or initiator is to be added prior to the commencement of the polymerization reaction, it is the last ingredient added to the premix. As has been pointed out, when adding the catalyst the temperature of the premix should be below the minimum temperature at which the catalyst becomes reactive. Further, when a particular catalyst being employed is not water-soluble, it should be added to the premix in a suitable solvent therefor which will insure emulsification in the premix and even distribution. Needless to say, any such solvent should be inert to the reaction ingredients and reaction conditions. For example, when employing isopropyl peroxydicarbonate as a catalyst, it is added to the premix in hexane. In the Examples, which follow hereinafter, wherever isopropyl peroxydicarbonate was used it was added to the premix or to the reactor in hexane.

The monomer premix, or reaction premix, is thereafter subjected to homogenization prior to entering the polymerization step or reactor. Any convenient means of homogenizing may be employed. We have found that a one stage Manton-Gaulin homogenizer (Model 31M-3TBA) is a convenient apparatus for homogenizing the premixes contemplated by the instant invention. The premix leaves the homogenizer and goes directly into the reaction vessel which preferably contains an inert atmosphere, such as nitrogen.

Homogenization is most important and necessary with increasing plasticizer content in the premix to be polymerized. Irrespective of the content of plasticizer used the best results, i.e., the most stable polymer latices, are obtained when the monomer and plasticizer are premixed and then homogenized prior to polymerization. Further, in addition to latex instability, polymer buildup on the reactor walls occurs to a very detrimental extent when homogenization is not employed.

Homogenization is necessary in order to assure the propr particle size. A particle size in the range of 0.5 to 15 microns is desirable, with most of the particles being less than 2 microns. It is to be noted that the particle size increases as the amount of plasticizer employed increases. However, it is necessary to stay within the range of particle size given in order to form a stable emulsion.

We have found that before homogenization the particle size of the monomer premix or emulsion will be in the range of 2 to 40 microns with no plasticizer present and in the range of 10 to 50 microns with 90 parts by weight of plasticizer present. On the other hand, after homogenization the particle size of the same premix or emulsion decreases to 0.5 to 2 microns with no plasticizer present and to 0.5 to 15 microns with 90 parts by weight of plasticizer present. In the latter case most of the particles are less than 2 microns in size.

In the plastimerization process of the present invention, pH is not critical provided that the homogenization step is applied. Good results have been obtained when using homogenization in the present process in a pH range of from about 3 to about 10. However, if one is polymerizing a monomer premix without homogenization then pH is critical and also, the particular emulsifier system employed is important. In such a case, a highly alkaline reaction medium is required with a pH of around 10. Also, the exact level of plasticizer that can be used without homogenization depends on the emulsifier system used and on the pH of the polymerization reaction. For example, high pH polymerizations using ammonium laurate emulsifier are better suited for plastimerization compared to sodium lauryl sulfate based polymerizations. However, when using homogenization, as described herein, then any pH or emulsifier system may be employed and obtain stable plasticized vinyl resin latices.

It should be noted that in addition to the choice of the proper emulsifier system, the pH of the reaction system can be adjusted as by the use of ammonium hydroxide, and the like. In addition one may employ buffering agents in the reaction mixture, such as trisodium phosphate, tetrasodium pyrophosphate, and the like. In any event, the plasticized vinyl polymer latex produced may subsequently be adjusted to any desired pH by suitable means.

To further illustrate the present invention, the following specific examples are given, it being understood that this is merely intended in an illustrative and not a limitative sense. In the examples all parts and percents are by weight unless otherwise indicated.

EXAMPLE I

In this example, two runs, along with a control run were made to show that the plasticizer must be thoroughly mixed with the monomer prior to the start of the polymerization reaction. The recipes employed in the polymerizations are given in the following table in which all the figues are in parts by weight based on the weight of the total composition.

Table I

| Run No. | 1 | 2 | Control |
|---|---|---|---|
| Vinyl chloride | 100 | 100 | 100 |
| Dioctyl phthalate | 15 | 15 | 15 |
| Water (demineralized) | 200 | 200 | 200 |
| Isopropyl peroxydicarbonate | 0.06 | 0.06 | 0.04 |
| Sodium lauryl sulfate (emulsifier) | 4 | — | 4 |
| Straight-chain dodecyl benzene sodium sulfate (emulsifier) | — | 4 | — |

In each of runs 1 and 2 a monomer premix tank or vessel was charged with vinyl chloride and the plasticizer dioctyl phthalate thoroughly mixed therein. While agitating this mixture, the water and emulsifier were added. Thereafter, the mixture was cooled to 20°C. and the isopropyl peroxydicarbonate added thereto. The tank was evacuated and nitrogen introduced. The entire mixture was then agitated for 15 minutes under a nitrogen atmosphere. Thereafter the mixture (monomer premix) was passed through a homogenizer into a polymerization reactor containing a nitrogen atmosphere. The homogenizer was a one stage Manton-Gaulin homogenizer (Model 31M-3TBA) operated at 750–1000 psi stage pressure. Thereafter the contents of the reactor were heated to the polymerization temperature and the reaction allowed to proceed to the desired conversion.

In the case of the control, all ingredients, except the plasticizer dioctyl phthalate were charged to the reactor and mixed. After the polymerization reaction had proceeded to 50% conversion of monomer to polymer latex, the plasticizer was metered into the reactor. The polymerization conditions and results of all the runs are given in the following table:

Table II

| Run No. | 1 | 2 | Control |
|---|---|---|---|
| Reaction Temp. °C. | 51 | 51 | 51 |
| Reaction Time, hours | 12 | 16 | Coagulated |
| Total solids, % | 31.5 | 33 | do. |
| Conversion, % | 84 | 88 | do. |
| Coagulum, % | 0 | 0 | do. |
| Plasticizer content, % | 14.7 | 14.7 | do. |
| Slurry condition | OK | OK | do. |
| pH | 7.1 | 3.3 | do. |

Thus it can be seen that the addition of plasticizer after the start of polymerization does not work. It is believed the results are self-explanatory.

EXAMPLE II

The purpose of this example was to show the criticality of homogenization to obtain good polymer latices containing the appropriate amount of plasticizer and without having to adjust the pH. Here again the recipes employed are given in the table which follows in which all figures are in parts by weight based on the weight of the total composition. Also, the runs made in this example show the importance of homogenization with increasing amounts of plasticizer and it is absolutely necessary when one employs more than about 60 parts of plasticizer to obtain satisfactory results.

Following the procedure outlined in Example I, Runs 3 and 4 were prepared the same way except that the $K_2S_2O_8$ was placed in the polymerization reactor prior to the introduction of the homogenized premix. In the case of the Controls 3 and 4, the same procedure was followed except that the premix was not homogenized prior to introduction into the polymerization reactor. The recipe, polymerization conditions and results, in each case, are set out in the following table:

ther. On the other hand, such a high pH does not affect the resultant product when the premix is homogenized, as witness Run 3. Without homogenization and without pH adjustment, it is impossible to obtain a product, as witness Control 4.

EXAMPLE III

In this example a series of runs were made to show that homogenization is essential to secure a good latex in both batch polymerization and in a polymerization employing premix proportioning. Further, these runs also show that the exact level of plasticizer that can be used without homogenization depends on the emulsifier system and on the polymerization pH. In Table IV that follows the conditions of reaction, recipe and results are set out in each case. Making of the premix and homogenization was carried out as described in Example I. Adding all the material to the reactor and then polymerizing is referred to as "batch polymerization" and adding the premix to the reactor continuously or intermittently during the reaction is referred to as proportioning. In Table IV several processes are referred Table III

| Run No. | 3 | Control 3 | 4 | Control 4 |
|---|---|---|---|---|
| Recipe | | | | |
| Vinyl chloride | 100 | 100 | 100 | 100 |
| Dioctyl phthalate | 90 | 90 | 90 | 90 |
| Water (demineralized) | 200 | 200 | 200 | 200 |
| Isopropyl peroxydicarbonate | — | — | 0.10 | 0.10 |
| T-butyl peroxypivalate | 0.1 | 0.1 | — | — |
| $K_2S_2O_8$ (potassium persulfate) | 0.05 | 0.05 | — | — |
| Lauric acid | 2 | 2 | — | — |
| Sodium lauryl sulfate | — | — | 4 | 4 |
| $NH_4OH$ | 0.66 | 0.66 | — | — |
| Polymerization conditions | | | | |
| Reaction temp. °C. | 51 | 51 | 51 | 51 |
| Reaction time, hours | 26 | 20 | 16 | 13 |
| Results | | | | |
| Total solids, % | 35 | Mushy mix | 40 | Thick charge-like a suspension slurry |
| Conversion, % | 75 | — | 81 | |
| Coagulum, % | 0 | Thick charge-like a suspension slurry | 0 | |
| pH | 11.3 | 11.3 | 3.1 | |
| Plasticizer content, % | 54.5 | — | 54.4 | |
| Slurry condition | OK | Thick mush | OK | |

It can readily be seen from the above Table III that without homogenization no satisfactory product is obtainable when employing high amounts of plasticizer (90 parts). Further, adjusting the pH to the highly alkaline side, as in Control 3, with $NH_4OH$ did not help either.

to which are identified as follows:
1. Batch polymerization of homogenized premix.
2. Batch polymerization of non-homogenized premix.
3. Proportioning of homogenized premix.
4. Proportioning of non-homogenized premix.

Table IV

| Run No. | 5 | 6 | 7 | 8 | 9 | 10 | 11 | 12 | 13 | 14 | 15 |
|---|---|---|---|---|---|---|---|---|---|---|---|
| Vinyl chloride | 100 | 100 | 100 | 100 | 100 | 100 | 100 | 100 | 100 | 100 | 100 |
| Dioctyl phthalate | 90 | 90 | 90 | 90 | 60 | 60 | 60 | 60 | 15 | 15 | 15 |
| Water (demineralized) | 200 | 200 | 200 | 200 | 200 | 200 | 200 | 200 | 200 | 200 | 200 |
| Sodium lauryl sulfate | 4.0 | 4.0 | 4.0 | 4.0 | 4.0 | 4.0 | 4.0 | 4.0 | — | — | 4.0 |
| Isopropyl peroxydicarbonate | 0.1 | 0.1 | 0.1 | 0.1 | 0.1 | 0.1 | 0.1 | 0.1 | 0.06 | 0.06 | 0.06 |
| Straight chain dodecyl benzene sodium sulfate | — | — | — | — | — | — | — | — | 4.0 | 4.0 | — |
| Process | (4) | (3) | (2) | (1) | (4) | (3) | (2) | (1) | (2) | (1) | (2) |
| Reaction temp., °C. | 45 | 45 | 51 | 51 | 45 | 45 | 45 | — | 51 | 51 | 51 |
| Reaction time, hours | 25 | 36 | 12 | 16 | 24 | 80 | 50 | 28 | 24 | 16 | |
| Total solids, % | 36 | 33 | * | 40 | ** | 45 | Coagulated | — | Coagulated | 33 | Coagulated |
| Conversion, % | 80 | — | * | 89 | ** | 100 | | — | | 92 | |
| Coagulum, % | 0 | 0 | 0 | 0 | 0 | 0 | | 0 | | 0 | |
| Slurry condition | Mushy | OK | *** | OK | Mushy | OK | | — | ed | OK | ed |
| pH | 3.8 | 5.3 | — | 3.1 | 5.0 | 3.6 | | — | | 3.3 | |

\* Too coarse
\*\* Too thick
\*\*\* Coarse

Looking at the Table above it can be seen that homogenization of the premix gives superior results as witness runs 6, 8, 10 and 14. This is so irrespective of the emulsifier used and the pH of the system.

EXAMPLE IV

In this example a series of runs were made to illustrate that the present invention, when employing homogenization of the monomer-plasticizer premix prior to the start of polymerization, is not limited to the use of any particular emulsifier. Further, the inventive process is not limited to a particular polymerization pH nor to a particular initiator or catalyst system. Again the general procedure outlined in Example I was followed in each of the runs made. In each run the procedure involved the batch polymerization of a homogenized premix. The following Table V contains all the data with respect to recipe, polymerization conditions and results.

Table V

| Run No. | 16 | 17 | 18 | 19 |
|---|---|---|---|---|
| Vinyl chloride | 100 | 100 | 100 | 100 |
| Isopropyl peroxydicarbonate | 0.06 | 0.06 | 0.10 | 0.1 |
| Dioctyl phthalate | 15 | 15 | 90 | 90 |
| Water (demineralized) | 200 | 200 | 200 | 200 |
| Sodium lauryl sulfate | 4.0 | — | 4.0 | 4.0 |
| Lauryl stenol alcohol | — | — | 4.0 | 2.1 |
| Straight chain dodecyl benzene sodium sulfate | — | 4.0 | — | — |
| Potassium persulfate | — | — | — | — |
| Lauric acid | — | — | — | — |
| NH₄OH | — | — | — | — |
| Reaction temp., °C. | 51 | 51 | 51 | 51 |
| Reaction time, hours | 12 | 16 | 16 | 14 |
| Total solids, % | 31.5 | 33 | 40 | 38 |
| Conversion, % | 84 | 88 | 81 | 80 |
| Coagulum, % | 0 | 0 | 0 | 0 |
| Dioctyl phthalate content, % | 14.7 | 14.7 | 54.4 | 62.1 |
| Slurry conditions | OK | OK | OK | OK |
| pH | 7.1 | 3.3 | 3.1 | 4.0 |

It is significant to note that the pH in the above runs varied from 3.0 to 10.0 which did not affect the resultant polymer latices when homogenization of the premix is employed.

EXAMPLE V

Two runs were made to demonstrate that the plastimerization process should be conducted at a temperature below the glass transition temperature (Tg) of the polymer being produced. In this example, in making a polyvinyl chloride latex, the temperature of polymerization should be below 80°C. The general procedure of Example I was followed using a batch polymerization technique of a homogenized premix. The tabulation of data and results are in the following Table VI.

Table VI

| Run No. | 20 | 21 |
|---|---|---|
| Vinyl chloride | 100 | 100 |
| Dioctyl phthalate | 90 | 90 |
| Sodium lauryl sulfate | 4.0 | 4.0 |
| Water (demineralized) | 200 | 200 |
| Isopropyl peroxydicarbonate | 0.1 | 0.005 |
| Reaction time, hours | 9 | 22 |
| Reaction temp., °C. | 51 | 80 |
| Total solids, % | 34 | 36 |
| Coagulum, % | 0 | 0 |
| pH | 3.8 | — |

The present invention offers many advantages such as the ability to produce vinyl resin latices having greatly improved colloidal stability. This property increases the shelf-aging of the vinyl resin latex. Further, the process described herein results in a more efficient incorporation of plasticizer in the polymer latex and more importantly, results in a reduced plasticizer extractability and migration.

The plastimerized vinyl resins produced by the present process are particularly useful in blending with latices of nitrile rubber, and the like, since it is possible to accomplish such blending on a roll mill without sticking. Further, when non-flammable properties are desired in the preplasticized vinyl resin, it is a simple matter to choose a suitable plasticizer which will result in such properties. Numerous other advantages of the present invention will be readily apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process of producing preplasticized polymers of vinyl and vinylidene halides and copolymers thereof with each other or either with one or more vinylidene monomers having at least one terminal

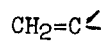

grouping comprising forming a monomer premix of the monomer or monomers to be polymerized, from about 5 parts to about 100 parts by weight of a plasticizer for the finished polymer based on 100 parts by weight of monomer or monomers being polymerized, a suitable emulsifier for the polymerization reaction, and the aqueous reaction medium, homogenizing said premix to a particle size in the range of 0.5 to 15 microns with most of the particles being less than 2 microns, passing said homogenized premix to a reaction zone, emulsion polymerizing said homogenized premix in said zone in the presence of catalytic amounts of a suitable catalyst therefor and at a temperature below the glass transition temperature of the polymer or copolymer being produced, and thereafter recovering the preplasticized polymer or copolymer.

2. A process as defined in claim 1 wherein the monomer in the premix is vinyl chloride.

3. A process as defined in claim 1 wherein the plasticizer is dioctyl phthalate.

4. A process as defined in claim 1 wherein the emulsifier is sodium lauryl sulfate.

5. A process as defined in claim 1 wherein the catalyst is isopropyl peroxydicarbonate.

6. A process as defined in claim 1 wherein the polymerizing temperature is in the range of about 15°C. to about 75°C.

7. A process as defined in claim 1 wherein the catalyst is added to the monomer premix and the temperature of the premix is maintained below the minimum temperature of reactivity of the catalyst prior to entering said reaction zone.

8. A process as defined in claim 2 wherein the plasticizer is dioctyl phthalate.

9. A process as defined in claim 8 wherein the emulsifier is sodium lauryl sulfate.

10. A process as defined in claim 2 wherein the catalyst is isopropyl peroxydicarbonate.

11. A process as defined in claim 10 wherein the temperature of reaction is below 80°C.

12. A process as defined in claim 11 wherein the emulsifier is sodium lauryl sulfate.

13. A process as defined in claim 12 wherein the plasticizer is dioctyl phthalate.

* * * * *